United States Patent Office 3,363,915
Patented Jan. 16, 1968

3,363,915
COUPLING ACTUATED LANDING GEAR AND BRAKE FOR TRACTOR-TRAILERS
Howard George Hands, deceased, late of Letchworth, England, by Raymond Harold Shotliff, 34 Ruskin Park House, Champion Hill, London, England, and John Frederick Goble, The Little House, Thorley Close, West Byfleet, Surrey, England, executors
Filed Aug. 6, 1965, Ser. No. 478,534
Claims priority, application Great Britain, Aug. 7, 1964, 32,294/64
5 Claims. (Cl. 280—427)

ABSTRACT OF THE DISCLOSURE

A trailer portion of an articulated vehicle comprising a trailer chassis with turntable means at its forward end including an upper turntable section on said chassis and a lower turntable framing rotatable relatively to said upper section and adapted to engage and lock to coupling means on the rear end of a tractor portion of the articulated vehicle, wheeled struts for supporting the forward end of said trailer portion when uncoupled which struts are hingedly mounted at their upper ends on said lower turntable framing so as to be swingable upwardly, at least one pair of folding toggle links connected between said framing and said struts whereby said struts are locked in the down position when the toggle links are straightened, means on said toggle links for engagement by an abutment on the tractor portion upon coupling whereby the toggle links are caused to fold and thereby swing up said wheeled struts, a plunger disposed substantially vertically at the centre of said turntable means for engagement upon coupling by a movable brake-operating element on the tractor portion, trailer-brake-operating means operatively connected to said plunger, a plate mounted for substantially horizontal movement with respect to said lower turntable framing, loading spring means acting between said plate and said framing, operative connections between said plate and said plunger whereby the load of said spring means is applied as trailer braking effort when the trailer portion is uncoupled, and a lever assembly fulcrummed at a point intermediate its ends on said framing and having one end thereof pivotally-connected to said plate and the opposite end thereof adapted and disposed for engagement by said toggle links when they fold when the trailer portion and tractor portion are coupled whereby said lever assembly is caused to swing and move said plate to relieve the spring loading from said trailer-brake-operating means.

Disclosure of invention

This invention relates to articulated road vehicles and more particularly to the brake-operating connections between the tractor and trailer portions of such a vehicle.

Whereas the brakes of the trailer portion of an articulated vehicle must be operable along with the tractor brakes when the tractor and trailer are coupled, a separate brake-operating control is ordinarily provided on the trailer so that the trailer brakes can be applied, independently of the tractor brakes, to hold the trailer stationary when the tractor is uncoupled therefrom. This necessitates the vehicle driver descending from his cab to apply the trailer brakes before uncoupling the tractor, and again to release the trailer brakes after recoupling and before driving the vehicle away. It is an object of the invention to improve the trailer braking arrangements.

According to the present invention, the trailer brake-operating connections are coupled to a spring-loaded mechanism for applying the brakes under the spring effort, and the spring-loading mechanism is arranged for automatic actuation as a result of the mutual engagement of tractor and trailer members, upon coupling of the tractor and trailer, to relieve the spring-loading on said brake-operating connections and thereby release the brakes. With such an arrangement the trailer brakes are automatically applied by spring effort upon uncoupling of the tractor and trailer, and released upon recoupling, without the driver having to take any separate action to operate the trailer brakes.

In the preferred form, the spring-loading is relieved by swinging of a depending lever, this lever being engaged and swung by members of the trailer front end support stand assembly which is normally provided under the turntable to support the front end of the trailer when uncoupled and which is ordinarily caused to retract upward and backward when coupling engagement of the tractor and trailer occurs.

Figure 1:
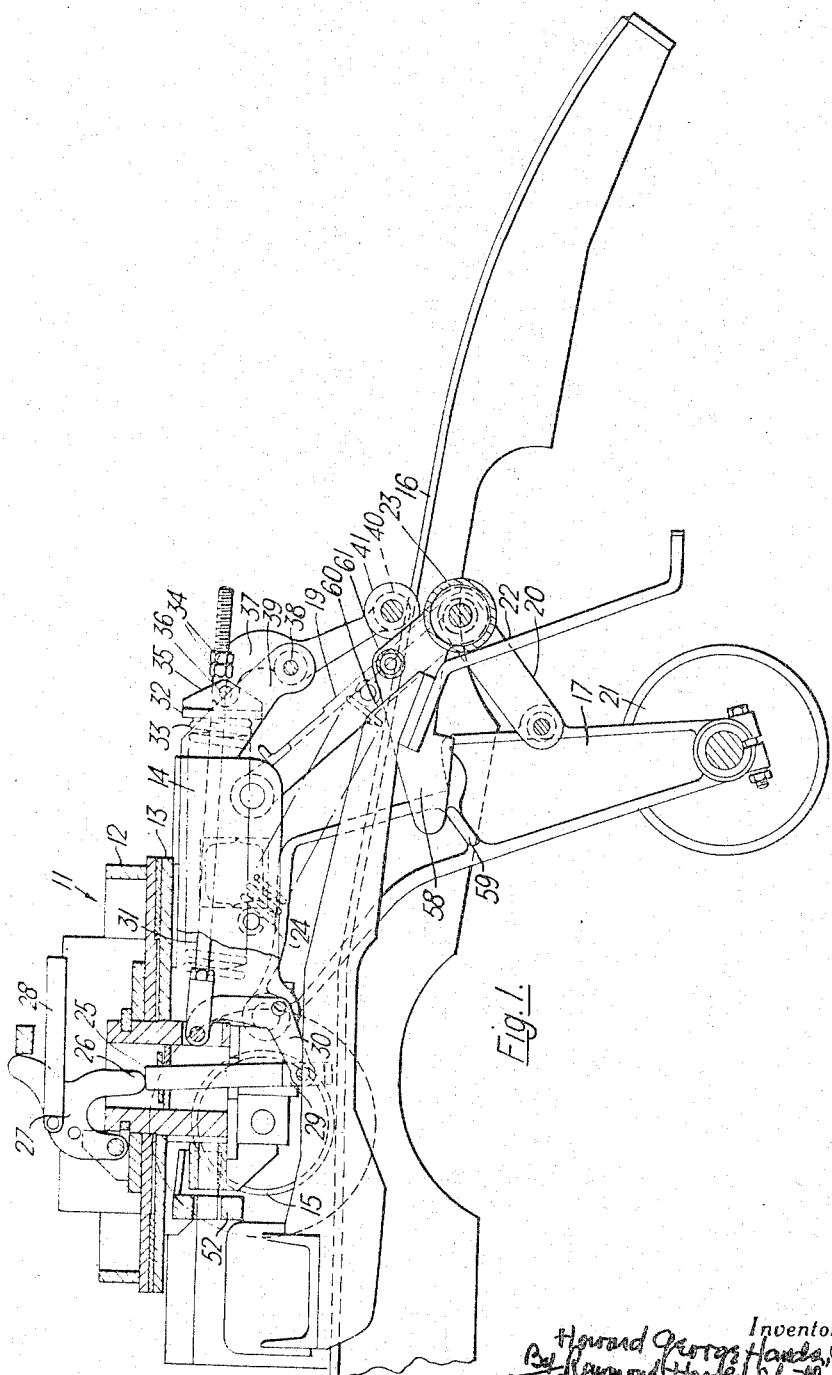
Figure 2:
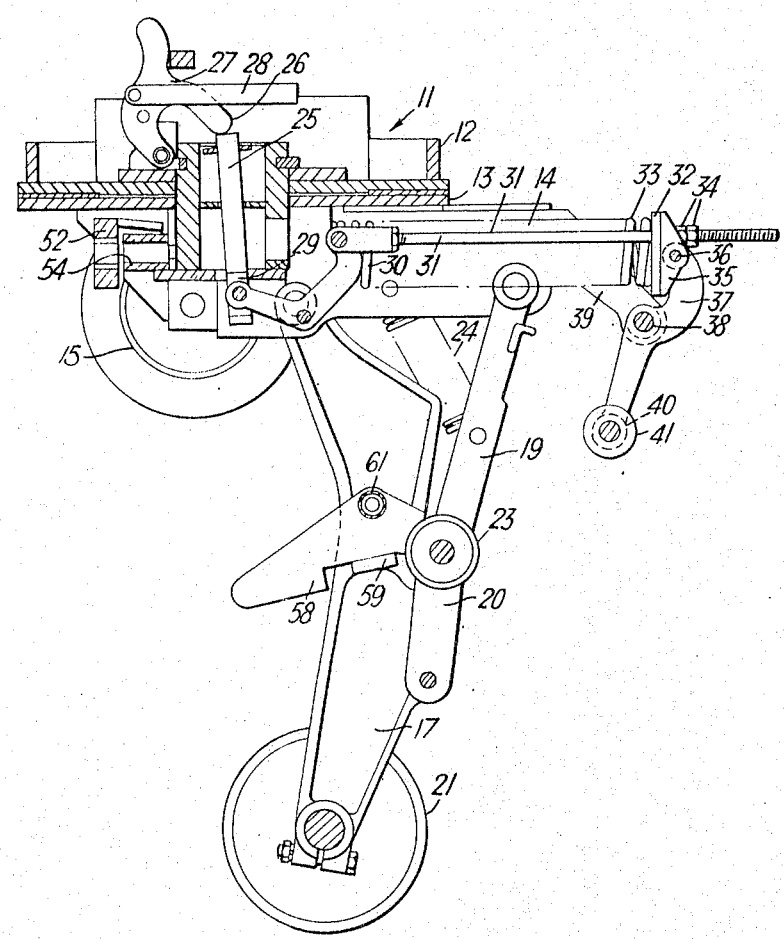
Figure 3:
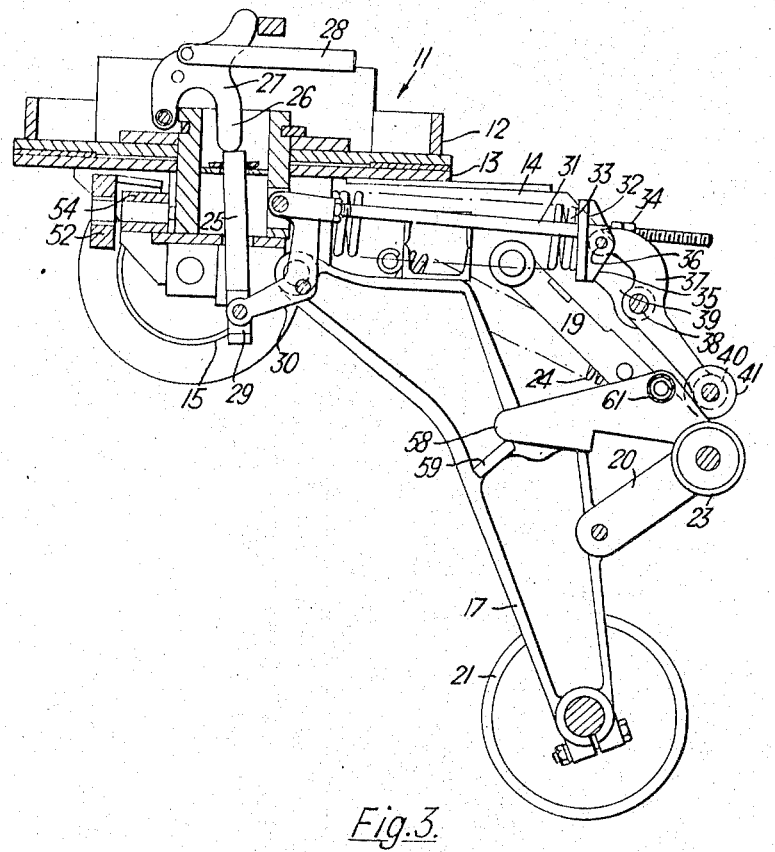
Figure 4:
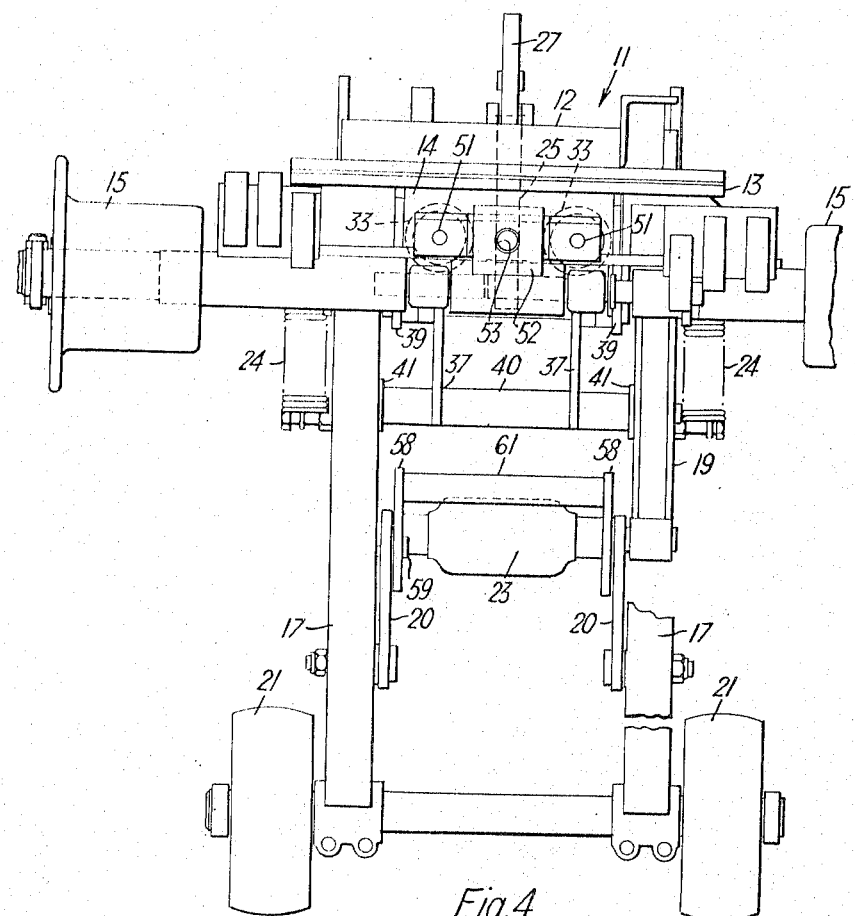
Figure 5:
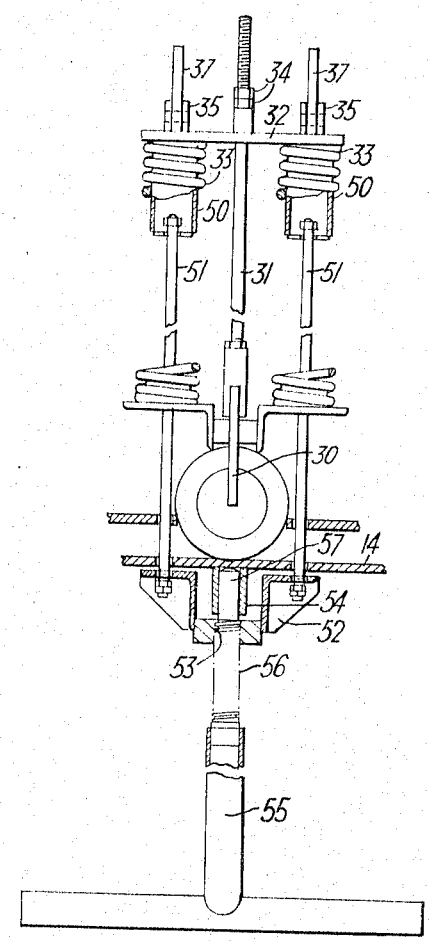

One construction in accordance with the invention will now be described by way of example, the arrangement being shown in the accompanying drawings in which:

FIGURE 1 is a side elevation, in longitudinal section, of the forward undercarriage of a trailer coupled to a tractor vehicle, FIGURE 2 is a similar view of the undercarriage in the fully down position after the tractor has been uncoupled, FIGURE 3 is a similar view of the undercarriage in the fully collapsed position, FIGURE 4 is a front end view, with parts in section, and FIGURE 5 is a plan view of the spring-loading gear for the brakes, partly in section.

The type of automatic tractor/trailer coupling shown in the drawings consists of a turntable 11 the upper section 12 of which is fixed to the underside of the front end of the trailer, while the lower section 13, which is rotatable relatively to the upper section, comprises a framing 14 provided with two side rollers 15 that run up ramps 16 on the tractor as the latter is backed up to the trailer, the tractor and trailer automatically becoming articulated together with the lower turntable framing locked to the tractor. Depending from the lower turntable framing 14 are a pair of interconnected struts 17 hinged to the framing, each braced by a pair of toggle links 19, 20, and each carrying a wheel 21 at the lower end. The struts 17 and links 19, 20 form the support stand for the front end of the trailer when disconnected from the tractor, the toggle links being loaded by springs 24 into the straightened condition to lock the struts for taking the trailer weight. In the down position of the struts the arms of a gravity latch 58 pivoted on the toggle links are engaged over detents 59 on the struts.

Upon coupling of the trailer to the tractor an abutment plate 22 on the tractor passes back between the struts 17 and engages a roller 23 mounted between the two pairs of toggle links 19, 20 at their hinge points. Also an abutment face 60 encounters a cross member 61 on the latch 58 and disengages this latch. The roller 23 is pushed rearwardly thereby breaking the toggles and forcing the struts 17 and the wheels 21 thereon to swing back and up against the action of the springs 24.

Through the centre of the turntable 11 is a substantially vertical plunger 25 the lower end of which is engaged, when the tractor and trailer are coupled, by a lever (not shown) actuated in conjunction with the tractor brakes. The upper end of the plunger bears on a depending tail 26 of a bell crank lever 27 that is connected to a brake rod 28 operating the trailer brakes, and the application of the tractor brakes pushes the plunger 25 upwards and applies the trailer brakes also.

In accordance with the invention this arrangement is adapted as follows. Towards the lower end of the plunger 25 is a slot 29 within which is pivoted one extremity of a bell crank level 30 the other extremity of which is pivotally connected to a substantially horizontal rod 31 passing rearwardly through the lower turntable framing. This rod emerges from and extends out well beyond said framing 14 and it also passes through a plate 32 spaced to the rear of the framing. A pair of large coil springs 33 are interposed between the framing 14 and the plate 32 to urge the plate away from the framing. The outer end of the rod 31 is screwed to receive locknuts 34 that are tightened on to the plate 32 to cause the springs 33 between it and the framing 14 to be placed in compression. It will be seen that when compressed these springs exert a pull on the horizontal rod 31 which is converted to an upward push on the plunger 25 and thus the trailer brakes are applied as long as the load of the springs is taken by the horizontal rod.

On the rear face of the plate 32, on either side of the rod 31 passing through it, are two brackets 35 which provide pivotal connection points 36 for the upper ends of a pair of depending levers 37 arranged to swing together in fore-and-aft vertical planes. At lower points 38 intermediate their ends the depending levers 37 are fulcrummed on further brackets 39 extending rearwardly from the lower turntable framing 14, and at their lower extremities the levers are united by a robust cross bar 40 which is extended outwardly of the levers 37 on either side to provide a pair of spindles on which rollers 41 are mounted. The arrangement is such that, although these rollers are well clear of the toggle links 19, 20 when the trailer is disconnected, upon coupling of the tractor to the trailer the rollers 41 are engaged and forced rearwardly by the upper links 19 of the toggle link pairs, as the trailer support struts 17 swing back, so that the depending levers 37 are caused to turn about their fulcrum points 38 and to push the plate 32, to which their upper ends are pivotally connected, forward against the compression springs 33 bearing thereon. This forward movement of the plate 32 is sufficient to relieve the spring load entirely from the horizontal rod 31 coupled to the brake-operating plunger 25 at the centre of the turntable, and therefore the trailer brakes are released automatically as coupling takes place. And conversely, the trailer brakes are applied automatically when the tractor is uncoupled, without the need in either case for the driver to leave his cab. The relieving of the spring load from the trailer brake-operating mechanism also allows the trailer brakes to be operable along with the tractor brakes in the usual manner when the tractor and trailer are coupled.

To enable the trailer to be moved when uncoupled, provision is made for the fitting of a handle that can be used to apply manual effort to relieve the spring load on the brake-operating mechanism. Conveniently this handle can also be arranged for use in manual turning of the turntable for steering the trailer as required. This arrangement is best seen in FIGURE 5. Horizontal cylinders 50 are mounted on the front face of the plate 32, and telescopically engaged with these cylinders are the rear ends of rods 51, the cylinders 50 and rods 51 extending within the coil springs 33. The rods 51 pass forwardly through the cross members of the framing 14 and their front ends carry a yoke 52 disposed just in front of the framing 14 and not secured thereto. The yoke 52 has a central screw-threaded bore 53 which lies in substantial alignment with a socket 54 fixed on the framing 14.

The handle 55, for applying manual effort to relieve the spring load, has a screw-threaded shank 56 and a plain end 57. The plain end is inserted into the socket 54 while the screw-threaded shank is engaged with the threaded bore 53 of the yoke 52. Thus, by turning the handle the yoke 52 can be drawn forward along the handle shank 56, and this also pulls forward the rods 51 which in turn pull on the plate 32 through the cylinders 50. The plate 32 is thus moved forward to remove the spring load from the rod 31.

The load exerted by the springs 33 can be adjusted at will by changing the position of the aforesaid locknuts 34 on the horizontal rod 31.

Modifications of the arrangement described are possible without departing from the scope of the invention. As an example, it is not necessary to have a pair of springs for applying the trailer brakes; one only, or more than two, could be employed.

I claim:

1. A trailer portion of an articulated vehicle, comprising a trailer chassis with turntable means at the forward end thereof including an upper turntable section fixed to said chassis and a lower turntable framing rotatable relatively to said upper section, said lower turntable framing being adapted to engage and lock to coupling means on the rear end of a tractor portion of the articulated vehicle, wheeled struts for supporting the forward end of said trailer portion when uncoupled which struts are hingedly mounted at their upper ends on said lower turntable framing so as to be swingable upwardly, at least one pair of folding toggle links connected between said framing and said struts whereby said struts are locked in the down position when the toggle links are straightened, means on said toggle links for engagement by an abutment on the tractor portion upon coupling whereby the toggle links are caused to fold and thereby swing up said wheeled struts, a plunger disposed substantially vertically at the centre of said turntable means for engagement upon coupling by a movable brake-operating element on the tractor portion, trailer-brake-operating means operatively connected to said plunger, a plate mounted for substantially horizontal movement with respect to said lower turntable framing, loading spring means acting between said plate and said framing, operative connections between said plate and said plunger whereby the load of said spring means is applied as trailer braking effort when the trailer portion is uncoupled, and a lever assembly fulcrummed at a point intermediate its ends on said framing and having one end thereof pivotally connected to said plate and the opposite end thereof adapted and disposed for engagement by said toggle links when they fold when the trailer portion and tractor portion are coupled whereby said lever assembly is caused to swing and move said plate to relieve the spring loading from said trailer-brake-operating means.

2. A trailer portion according to claim 1, wherein manually operable means are provided for relieving the spring-loading from said trailer brake-operating means at will, and thereby releasing the brakes while the trailer is uncoupled.

3. A trailer portion according to claim 1, wherein the aforesaid plate is disposed to the rear of said framing, the springs between the plate and the framing are coil compression springs tending to urge the plate rearwardly, and thereby said opposite end of said lever assembly forwardly, and the wheeled struts are arranged to swing up and back, and the toggle links to fold rearwardly, as the tractor and trailer portions are coupled, said opposite end of said lever assembly being disposed to be engaged by an upper toggle link of said pair of toggle links during such folding.

4. A trailer portion according to claim 3, wherein the plate is connected to a yoke in front of said framing by coupling members extending through the framing, and means is provided to draw forward the yoke and with it the plate.

5. A trailer portion according to claim 4, wherein a removable manual brake release handle has a screw-threaded shank to engage in a threaded bore in the yoke, and a plain end for location in a socket on the front of the framing in alignment with the bore in the yoke, whereby when the handle is in place turning of it in the appropriate direction draws the yoke forward away from the framing.

References Cited

UNITED STATES PATENTS

| | | | |
|---|---|---|---|
| 2,055,109 | 9/1936 | North et al. | 188—3 |
| 2,123,820 | 7/1938 | Winn | 280—420 |
| 2,798,575 | 7/1957 | Grant | 188—3 |

FOREIGN PATENTS 489,383  7/1938  Great Britain.

LEO FRIAGLIA, *Primary Examiner.*